(12) United States Patent  
Kang

(10) Patent No.: US 10,182,475 B2
(45) Date of Patent: Jan. 15, 2019

(54) LIGHT EMITTING DIODE DRIVER CIRCUIT AND METHOD FOR LIGHT EMITTING DIODE DRIVING

(71) Applicant: SAMSUNG ELECTRONICS CO., LTD., Suwon-si (KR)

(72) Inventor: Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/097,372

(22) Filed: Apr. 13, 2016

(65) Prior Publication Data

US 2016/0309555 A1    Oct. 20, 2016

(30) Foreign Application Priority Data

Apr. 20, 2015  (KR) .......................... 10-2015-0055464

(51) Int. Cl.
```
H05B 33/08      (2006.01)
G02F 1/1335     (2006.01)
G09G 3/34       (2006.01)
H04N 13/32      (2018.01)
H04N 13/31      (2018.01)
H04N 13/359     (2018.01)
H04N 13/398     (2018.01)
G09G 3/00       (2006.01)
G09G 3/3233     (2016.01)
```
(52) U.S. Cl.
CPC ... *H05B 33/0815* (2013.01); *G02F 1/133603* (2013.01); *G09G 3/342* (2013.01); *H04N 13/31* (2018.05); *H04N 13/32* (2018.05); *H04N 13/359* (2018.05); *H04N 13/398* (2018.05); *H05B 33/0812* (2013.01); *H05B 33/0824* (2013.01); *H05B 33/0827* (2013.01); *H05B 33/0845* (2013.01); *G09G 3/003* (2013.01); *G09G 3/3233* (2013.01); *G09G 3/3426* (2013.01); *G09G 2310/0264* (2013.01); *G09G 2320/064* (2013.01); *G09G 2340/10* (2013.01)

(58) Field of Classification Search
CPC ...... G02F 1/133603; G09G 2310/0264; G09G 2340/10
See application file for complete search history.

(56) References Cited

U.S. PATENT DOCUMENTS

| | | | | |
|---|---|---|---|---|
| 2008/0100561 | A1* | 5/2008 | Price ..................... | C09K 9/02 345/102 |
| 2009/0302776 | A1* | 12/2009 | Szczeszynski ..... | H05B 33/0815 315/246 |

(Continued)

*Primary Examiner* — Chun-Nan Lin
(74) *Attorney, Agent, or Firm* — Sughrue Mion, PLLC

(57) ABSTRACT

A light emitting diode driving circuit including a first LED array; a second LED array; an LED driving circuit configured to provide a constant current to the first LED array and/or the second LED array; a linear circuit configured to selectively provide a second current that is smaller than the constant current to the second LED array; and a driving controller configured to control the LED driving circuit and the linear circuit such that the constant current is selectively provided to the first LED array or the second LED array based on an operating mode, and such that the second current is provided to the second LED array only when the constant current is being provided to the first LED array.

11 Claims, 14 Drawing Sheets

(56) References Cited

U.S. PATENT DOCUMENTS

| | | | | |
|---|---|---|---|---|
| 2010/0289982 A1* | 11/2010 | Akiyama | ............... | G09G 3/342 |
| | | | | 349/61 |
| 2012/0212142 A1* | 8/2012 | Ryu | .................... | H05B 33/0815 |
| | | | | 315/186 |
| 2013/0050288 A1* | 2/2013 | Kang | ................. | H05B 33/0815 |
| | | | | 345/690 |
| 2013/0050289 A1* | 2/2013 | Kang | ..................... | G09G 3/342 |
| | | | | 345/690 |
| 2014/0191673 A1* | 7/2014 | Yoon | ................. | H05B 33/0809 |
| | | | | 315/192 |
| 2014/0354181 A1* | 12/2014 | Zhang | ................. | G09G 3/3406 |
| | | | | 315/307 |
| 2015/0294615 A1* | 10/2015 | Zhang | ............... | H05B 33/0818 |
| | | | | 345/212 |
| 2015/0334791 A1* | 11/2015 | Cao | ......................... | G09G 3/34 |
| | | | | 315/192 |
| 2015/0382420 A1* | 12/2015 | Sakai | ................. | H05B 33/0803 |
| | | | | 315/193 |

\* cited by examiner

3D MODE

2D MODE

LIGHT EMITTING DIODE DRIVER CIRCUIT AND METHOD FOR LIGHT EMITTING DIODE DRIVING

CROSS-REFERENCE TO RELATED APPLICATIONS

This application claims priority from Korean Patent Application No. 10-2015-0055464, filed on Apr. 20, 2015, in the Korean Intellectual Property Office, the disclosure of which is incorporated herein by reference in its entirety.

BACKGROUND

1. Field

Apparatuses and methods consistent with exemplary embodiments broadly relate to a light emitting diode driving circuit, and a display apparatus having the same and a method for driving the light emitting diode, and more particularly, to a light emitting diode driving circuit configured to stably light a 3D backlight with a fine current even when displaying a 2D image in a glassless 3D display apparatus that operates in a dual backlight method, and a display apparatus having the same and a method for driving the light emitting diode.

2. Description of the Related Art

With the development of electronic technologies, various kinds of electronic devices are being developed and distributed. Especially, various kinds of display apparatuses such as TVs, smart phones, mobile phones, PDAs, MP3 players, kiosks, electronic picture frames, electronic displays, and e-books are being widely used.

Recently, 3D display systems capable of allowing viewers to view 3D contents have been developed and widely spread. 3D display systems are generally classified into glassless systems where viewers may view 3D contents without glasses, and glass systems where viewers need to wear glasses to view 3D contents.

Glass systems are applied to apparatuses such as TVs or movie theaters where numerous people view contents, whereas glassless systems are applied to tablets or smart phones generally used by one user alone.

Parallax barrier type glass systems and lenticular lens glass systems are widely used glass systems. Recently, methods using dual backlight are being widely reviewed due to their inexpensive material cost and capital investment cost.

Such a dual backlight method is a method of using two backlights provided on a back surface of an LCD panel: a first backlight to be used during a 3D operation, and a second backlight to be used during a 2D operation. The first backlight that is used during a 3D operation emits light by an interval related to a pixel structure of liquid crystal, thereby enabling different images of the liquid crystal to be focused on a left eye and a right eye of a viewer.

However, such a dual backlight method has a problem that during a 2D operation, the light being emitted from the second backlight provided to be used during a 2D operation is partially interrupted by the first backlight, thereby forming a dark portion on a partial area of the screen.

Therefore, even during a 2D operation, it is necessary to light the first backlight provided to be used during a 3D operation with a fine current in order to remove the dark portion, but the fine current for removing such a dark portion is only about 2~3% of the normal current usually generated during a 3D mode, and thus, it is very difficult to perform stable control with an LED driving circuit.

SUMMARY

Exemplary embodiments may overcome problems described above, that is to provide a light emitting diode driving circuit capable of stably lighting a 3D backlight with a fine current even when displaying a 2D image in a glassless 3D display apparatus that operates in a dual backlight method, and a displaying apparatus having the same and a method for driving the light emitting diode. Exemplary embodiments may overcome the above disadvantages and other disadvantages not described above. Also, exemplary embodiments are not required to overcome the disadvantages described above, and an exemplary embodiment may not overcome any of the problems described above.

According to an aspect of an exemplary embodiment, there is provided a light emitting diode driving circuit including a first LED array; a second LED array; an LED driving circuit configured to provide a constant current to at least one of the first LED array and the second LED array; a linear circuit configured to selectively provide a second current that is smaller than the constant current to the second LED array; and a driving controller configured to control the LED driving circuit and the linear circuit such that the constant current is selectively provided to the first LED array or the second LED array according to an operating mode, and where the second current is provided to the second LED array only when the constant current is being provided to the first LED array.

According to exemplary embodiments, the first LED array may be arranged in a first backlight panel of a direct method, the second LED array may be arranged in a second backlight panel of an edge method in front of the first backlight panel, and the second backlight panel may emit light only in a predetermined area of an LCD corresponding to a pixel structure of liquid crystal.

The driving controller may control the LED driving circuit such that different size constant currents are provided to the first LED array and the second LED array based on the operating mode.

The driving controller may control the LED driving circuit in response to a first dimming cycle during a 2D mode, and the linear circuit may continuously provide the second current to the second LED array regardless of the first dimming cycle.

The linear circuit may include a switch device connected to an end of the second LED array; a resistor connected to another end of the switch device; and a comparator configured to compare a voltage of the resistor with a predetermined threshold voltage and control the switch device based on the comparison.

The light emitting diode driving circuit may further include a compensator configured to compensate the voltage of the resistor and to provide the compensated voltage to the comparator.

A resistance value of the resistor may be twenty to thirty times greater than a resistance value of a resistor in the LED driving circuit.

The LED driving circuit may include a power source configured to provide power; an inductor which has one end connected to the power source; a first switch device configured to selectively connect the inductor to a ground end of the power source according to a control signal of the driving controller; a diode which has an anode commonly connected to an end of the first switch device and to another end of the inductor, and of which a cathode is commonly connected to an end of the first LED array and to an end of the second LED array; a capacitor which has an end commonly connected to a cathode of the diode, to the one end of the first LED array, and to the one end of the second LED array, and which has another end connected to the ground end of the power source; a second switch device connected to another end of the first LED array; a first resistor which has an end connected to another end of the second switch device, and which has another end connected to the ground end of the power source; a third switch device connected to another end of the second LED array; and a second resistor which has an end commonly connected to the another end of the third switch device, and which has another end connected to the ground end of the power source.

Furthermore, the LED driving circuit may include a power source configured to provide power; an inductor which has an end connected to the power source; a first switch device configured to selectively connect the inductor to a ground end of the power source according to a control signal of the driving controller; a diode which has an anode commonly connected to an end of the first switch device and to another end of the inductor, and which has a cathode commonly connected to an end of the first LED array and to an end of the second LED array; a capacitor which has an end commonly connected to the cathode of the diode, to the one end of the first LED array, and to the one end of the second LED array, and which has another end connected to the ground end; a second switch device connected to another end of the first LED array; a third switch device connected to another end of the second LED array; and a fourth resistor which has an end commonly connected to another end of the second switch device and to another end of the third switch device, and which has another end connected to the ground end of the power source.

The driving controller may alternately operate the second switch device and the third switch device according to the operating mode.

According to yet another exemplary embodiment, there is provided a display apparatus including an LCD panel configured to receive an image signal and to display an image; a backlight including a first LED array and a second LED array, and configured to provide a light corresponding to an operating mode of the display apparatus to the LCD panel; and an image signal provider configured to provide an image signal corresponding to the operating mode to the LCD panel, and to provide a dimming signal corresponding to the image signal to the backlight, where the backlight includes a linear circuit configured to provide to the second LCD array a second current that is smaller than a constant current corresponding to the dimming signal only during a 2D mode.

The LCD panel may mix a left eye image and a right eye image in a grid and simultaneously display the same.

The backlight may include a first backlight panel where the first LED array is arranged in a direct method; and a second backlight panel where the second LED array is arranged between the first backlight panel and the LCD panel in an edge method, where the second backlight panel emits light to an LCD only in a predetermined area corresponding to a pixel structure of liquid crystal.

The backlight may further include an LED driving circuit configured to provide a constant current to at least one of the first LED array and the second LED array; and a driving controller configured to control the LED driving circuit and the linear circuit such that the constant current is selectively provided to the first LED array or the second LED array based on an operating mode, and that the second current is provided to the second LED array only when the constant current is provided to the first LED array.

According to yet another exemplary embodiment, there is provided a method of driving a light emitting diode of a light emitting diode driving circuit for providing a constant current to a first LED array and a second LED array, the method including selectively providing the constant current generated in the LED driving circuit to an LED array such as the first LED array or the second LED array based on an operating mode; and in response to the operating mode being a 2D mode, providing to an LED array to which the constant current has not been provided, a second current that is smaller than the constant current, using a linear circuit.

The providing the constant current may include providing different size constant currents to the first LED array and the second LED array based on the operating mode.

The providing a constant current may include providing to the first LED array a constant current corresponding to a first dimming cycle during the 2D mode, and the providing the second current may include continuously providing the second current to the second LED array regardless of the first dimming cycle.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
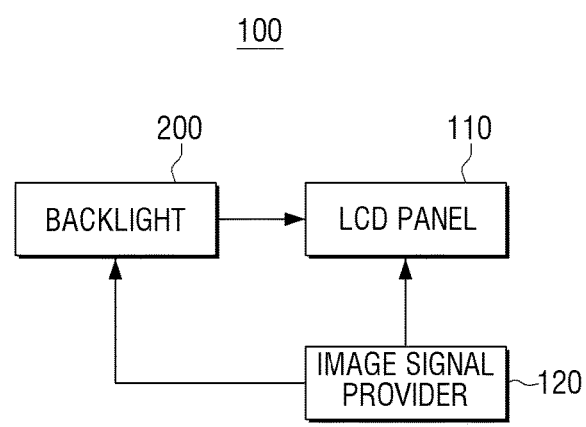
FIG. 1 is a block diagram illustrating a configuration of a display apparatus according to an exemplary embodiment.

Certain exemplary embodiments will now be described in greater detail with reference to the accompanying drawings. In the following description, same drawing reference numerals are used to denote analogous elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present disclosure are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

FIG. 1 is a block diagram illustrating a configuration of a display apparatus according to an exemplary embodiment.

Referring to FIG. 1, the display apparatus according to an exemplary embodiment 100 may include an LCD panel 110, image signal provider 120, and backlight 200.

The LCD panel 110 receives an image signal, and displays the received image signal. More specifically, the LCD panel 110 is driven by a potential difference between a pixel electrode and a common electrode. By such a potential difference, the LCD panel 110 may transmit a light emitted from the backlight 200 through an LC or adjust the degree of transmission and display a tone. That is, the LCD panel 110 may adjust the LC according to the image signal being provided from the image signal provider 120 that will be explained hereinafter and display an image.

The image signal provider 120 provides the image signal to the LCD panel 110. More specifically, the image signal provider 120 may provide to the LCD panel 110 image data and/or various image signals for displaying the image data in response to the image data.

More specifically, when the display apparatus 100 operates in a 2D mode, the image signal provider 120 may provide an image signal of a 2D image to the image signal provider 120. Furthermore, when the display apparatus 100 operates in a 3D mode, the image signal provider 120 may mix a left eye image and a right eye image that constitute a 3D image in a grid and simultaneously provide the same to the LCD panel 110.

Furthermore, the image signal provider 120 may extract brightness information corresponding to the image signal, and generate a dimming signal corresponding to the extracted brightness information. Furthermore, the image signal provider 120 may provide the generated dimming signal to the backlight 200. Such a dimming signal may be PWM signal, and a dimming signal in a 2D mode and a dimming signal in a 3D mode may be different from each other. For example, the image signal provider 120 may provide a dimming signal of a 60% duty to the backlight 200 during a 2D mode, and then, when a conversion is made to a 3D mode, the image signal provider 120 may provide to the backlight 200 a dimming signal of a different duty, for example, a 70~80% duty. Meanwhile, according to exemplary embodiments, the image signal provider 120 may transmit a dimming signal through one line, or through two separate lines, that is, one for a dimming signal during a 2D mode and another for a dimming signal during a 3D mode, separately.

The backlight 200 emits light to the LCD panel 110. More specifically, the backlight 200 may include a first LED array and a second LED array, and may provide a light corresponding to the operating mode of the display apparatus 100 to the LCD panel 110.

More specifically, in a 3D mode, the backlight 200 may provide a constant current corresponding to the 3D dimming signal to the second LED array corresponding to the 3D mode, and provide the light corresponding to the 3D dimming signal to the LCD panel 110. In this case, the first LED array does not operate.

Furthermore, in a 2D mode, the backlight 200 may provide a constant current corresponding to the 2D dimming signal to the first LED array corresponding to the 2D mode, and provide the light corresponding to the 2D dimming signal to the LCD panel 110. In this case, the backlight 200 may provide a fine current of about 2~3% of the constant current (maximum current) to the second LED array, thereby preventing a dark current from being generated by the 3D backlight. This will be explained hereinafter with reference to FIGS. 3 to 6, according to exemplary embodiments. Such a backlight 200 may be called an LED driving apparatus or an LED driving circuit.

More specific configuration and operations of the backlight 200, according to exemplary embodiments, will be explained hereinafter with reference to FIGS. 7 and 8.

Figure 2:
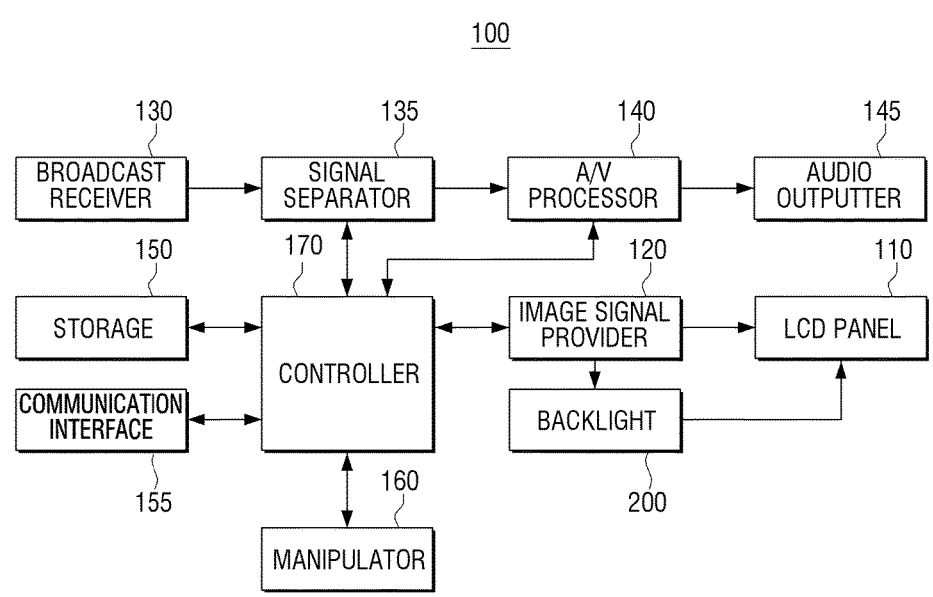
FIG. 2 is a block diagram illustrating a detailed configuration of a display apparatus according to an exemplary embodiment.

Hereinabove, only the configuration of the display apparatus 100 was explained, according to an exemplary embodiment, but the display apparatus 100 may include a configuration as illustrated in FIG. 2. The detailed configuration of the display apparatus 100 will be explained hereinafter with reference to FIG. 2, according to an exemplary embodiment.

FIG. 2 is a block diagram illustrating a detailed configuration of a display apparatus according to an exemplary embodiment.

Referring to FIG. 2, the display apparatus according to an exemplary embodiment 100 includes an LCD panel 110, an image signal provider 120, a broadcast receiver 130, a signal separator 135, an A/V processor 140, an audio outputter 145, a storage 150, a communication interface 155, a manipulator 160, a controller 170, and a backlight 200. Such a display apparatus 100 may be a 3D display apparatus configured to display a 3D image, especially, a glassless 3D display apparatus capable of displaying a 3D image without glasses.

Since operations of the LCD panel 110 and the backlight 200 are analogous to the operations of the LCD panel 110 and the backlight 200 described with reference to FIG. 1, repeated description will be omitted.

The broadcast receiver 130 receives a broadcast signal via a wired network or wirelessly from a broadcasting station or a satellite, and demodulates the received broadcast signal.

The signal separator 135 separates the received broadcast signal into an image signal, an audio signal, and an additional information signal. Furthermore, the signal separator 135 transmits the separated image signal and audio signal to the A/V processor 140.

The A/V processor 140 performs signal processing such as video decoding, video scaling, audio decoding, and the like for the image signal and audio signal input from the broadcast receiver 130 and storage 150. Furthermore, the A/V processor 140 outputs the image signal to the image signal provider 120, and outputs the audio signal to the audio outputter 145.

Meanwhile, in the case of storing the received image and audio signal in the storage 150, the A/V processor 140 may output the image and the audio in a compressed format to the storage 150.

The audio outputter 145 may convert the audio signal being output from the A/V processor 140 into sound and output the sound through a speaker (not illustrated), or to an external device connected through an external output terminal (not illustrated).

The image signal provider 120 generates a graphical user interface (GUI) to be provided to a user. Furthermore, the image signal provider 120 may add the GUI to the image output from the A/V processor 140. Furthermore, the image signal provider 120 provides to the LCD panel 110 an image signal corresponding to the image to which the GUI has been added. Accordingly, the LCD panel 110 displays various pieces of information provided by the display apparatus 100 and the image transmitted from the image signal provider 120.

Furthermore, the image signal provider 120 may generate brightness information corresponding to the image signal provided to the LCD panel 110, and generate a dimming signal corresponding to the generated brightness information. Such a dimming signal may be a pulse width modulated (PWM) signal having a predetermined frequency and a duty ratio, which varies depending on the brightness value.

Furthermore, the image signal provider 120 may provide the generated dimming signal to the backlight 200. Meanwhile, although it is described that the image signal provider 120 generates a dimming signal for the backlight, according to exemplary embodiments, the LCD panel may generate the dimming signal and provide the generated dimming signal to the backlight 200.

Furthermore, the storage 150 may store image contents. More specifically, the storage 150 may receive from the A/V processor 140 an image content in which an image and audio signal have been compressed and store the same, and may output the stored image content to the A/V processor 140 according to a control by the controller 170. Meanwhile, the storage 150 may be realized as a hard disc, nonvolatile memory, volatile memory and the like.

The communication interface 155 may be formed to connect the display apparatus 100 to an external device (not illustrated). Herein, the communication interface 1550 may be realized not only in the form of connecting the display apparatus 100 through a LAN (Local Area Network) or the internet, but also in the form of connecting the display apparatus 100 through a USB (Universal Serial Bus) port. If it is possible to transmit/receive image contents through such a communication interface 155, it is also possible to receive a control command for controlling the display apparatus 100.

The manipulator 160 is implemented as a touch screen, a touch pad, a key button, or a key pad, and provides a manipulation of a user to the display apparatus 100. In an exemplary embodiment, receiving a control command through the manipulator 160 provided in the display apparatus 100 was explained, but the manipulator 160 may receive a manipulation of the user from an external control apparatus (for example, remote control). That is, a control command may be received through the aforementioned communication interface 155.

The controller 170 controls the overall operations of the display apparatus 100. More specifically, the controller 170 may control the LCD panel 110, the image signal provider 120, and the backlight 200 such that an image according to the control command received through the manipulator 160 is displayed.

The display apparatus, according to an exemplary embodiment, may light a dark portion that may be generated by the dual backlight structure during a 2D mode with a fine current in a 3D backlight thereby preventing screen degradation. Furthermore, since the fine current is provided to the 3D backlight using a separate linear circuit and not an LED driving circuit of related art, a stable control is possible.

Meanwhile, although it was explained with reference to FIG. 2 that the aforementioned function is applied only to a display apparatus configured to receive and display a broadcast signal, a light emitting diode driving circuit as that will be explained hereinafter may be applied to any electronic apparatus that operates in a dual backlight method, according to an exemplary embodiment.

Meanwhile, although it was explained that the backlight 200 is included in the display apparatus 100, the functions of the backlight 200 may be realized in a separate device.

Figure 3:
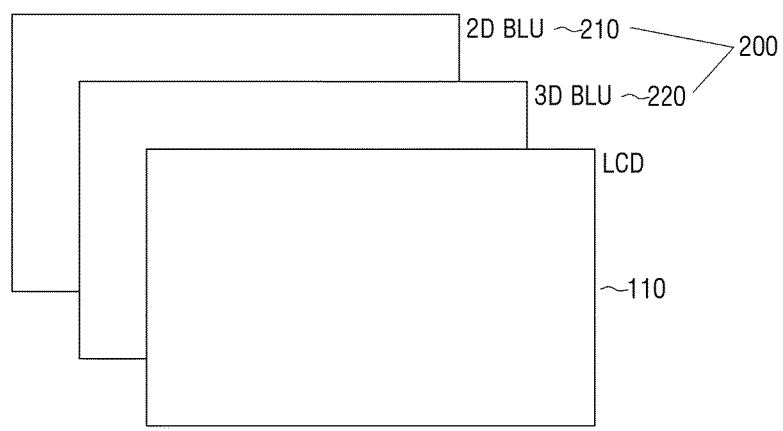
FIG. 3 is a view illustrating a schematic structure of a 3D panel of a dual backlight method according to an exemplary embodiment.

FIG. 3 is a view schematically illustrating a structure of a 3D panel of a dual backlight method according to an exemplary embodiment.

Referring to FIG. 3, a panel that is capable of displaying a 3D image without glasses includes an LCD panel 110 and two backlight panels 210 and 220, collectively backlight 200.

The LCD panel 110 may transmit the light emitted from the backlight 200 through an LC or adjust the degree of transmission and display a tone.

The first backlight panel 210 (or 2D backlight panel) is a backlight channel that is arranged on a rear side of the LCD panel 110 to emit light to the LCD panel 110 in a direct method. In this case, as for the direct method, an LED is directly arranged on an upper surface of a backlight cover, where the LED is used along with an optical film and thus, the uniformity properties of light are good, and a problem of overheating can be avoided. Such a first backlight panel 210 is driven when the display apparatus 100 operates in a 2D mode, and the first backlight panel 210 may emit light evenly to all directions on an entirety of the surface. The first backlight panel 210 has a first LED array. More specifically, the first backlight panel 210 refers to the first LED array and a direct type structure combined, but hereinafter, for ease of explanation, the first LED array will refer to the first backlight panel 210.

The second backlight panel 220 (or 3D backlight panel) is a backlight panel arranged between the LCD panel 110 and the first backlight panel 210 to emit light to the LCD panel 110 in an edge method. At this time, as for the edge method, an LED is arranged on one side of a back light unit (BLU), and a light guide plate is required to improve the uniformity properties of light. Such a second backlight panel 220 is driven when the display apparatus 100 operates in a 3D mode, and the second backlight panel 220 emits light to an LCD only in a predetermined area corresponding to a pixel structure of liquid crystal. This will be explained in more detail with reference to FIG. 4, according to an exemplary embodiment. The second backlight panel 220 has a second LED array. More specifically, the second backlight panel refers to the second LED array and an edge type structure combined, but hereinafter, for ease of explanation, the second LED array will refer to the second backlight panel.

Figure 4:
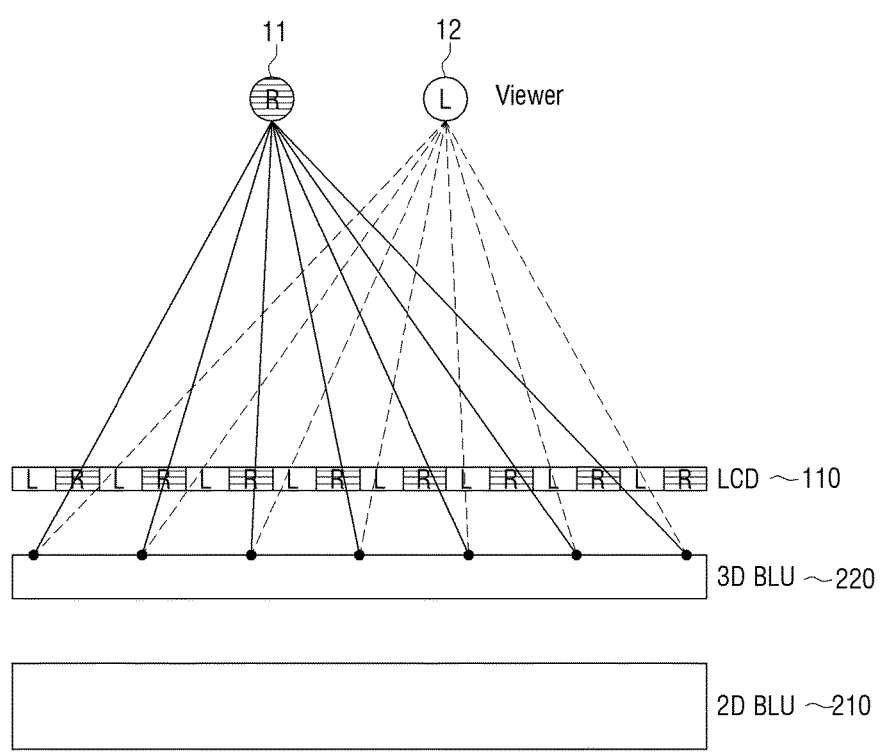
FIG. 4 is a view illustrating a glassless 3D display method that uses a dual backlight method according to an exemplary embodiment.

FIG. 4 is a view illustrating a glassless 3D display method using a dual backlight method according to an exemplary embodiment.

Referring to FIG. 4, on the LCD panel 110, a left eye image and a right eye image are arranged alternately, and the second backlight panel 220 is arranged at a predetermined distance from the LCD panel 110. Furthermore, the second backlight panel 220 does not emit light from all areas, but emits light from a certain area. Therefore, the light transmitted to the liquid crystal corresponding to a left eye image is focused at a left eye of the viewer, and the light transmitted to the liquid crystal corresponding to a right eye image is focused at a right eye of the viewer. Accordingly, the viewer is able to view a 3D image without wearing a pair of glasses.

Figure 5:
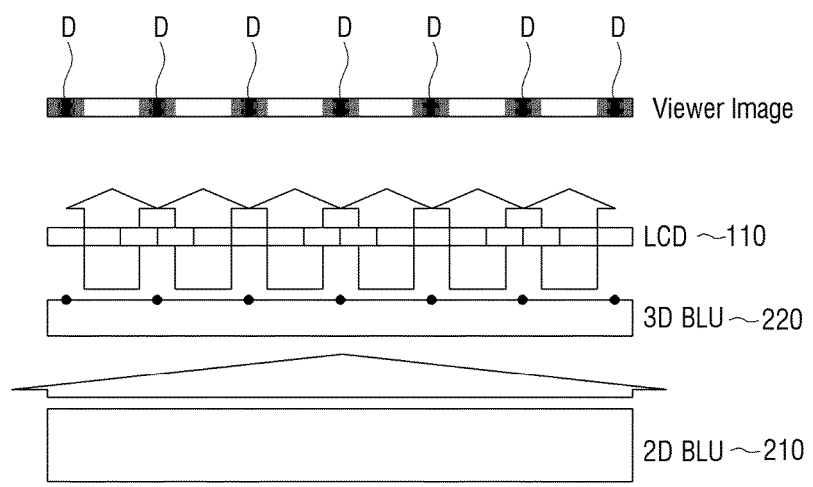
FIG. 5 is a view illustrating dark portions appearing on a screen due to a 3D backlight during a 2D mode.

However, in the case of viewing a 2D image, the light emitted from the first backlight panel 210 is partially interrupted by the second backlight panel 220 arranged between the first backlight panel 210 and the LCD panel 110, thereby generating a dark portions D in an area of the screen as illustrated in FIG. 5.

Figure 6A:
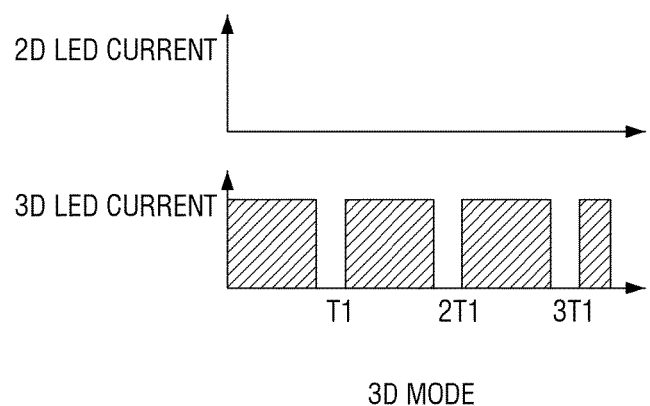
FIGS. 6A and 6B are views illustrating a backlight driving method to avoid dark portions such as the ones depicted in FIG. 5, according to an exemplary embodiment.
Figure 6B:
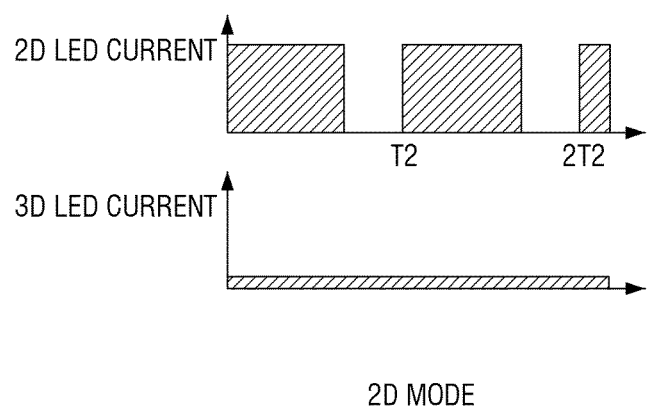

In order to resolve this problem, the backlight 200 is driven as illustrated in FIG. 6, according to an exemplary embodiment. More specifically, in a 3D mode as in FIG. 6A, the second backlight panel 220 is controlled such that a constant current corresponding to a dimming signal flows to the LCD 110, but in a 2D mode, it is required to control the first backlight panel 210 such that a constant current corresponding to a dimming signal flows while controlling such that a current of 2~3% of a normal current flows in the second backlight panel 220 as in FIG. 6B.

Meanwhile, in the case of using an LED driving circuit of related art to provide such a fine current, it is required to reduce the reference current to a current that is 2~3% smaller than the reference current that would be used in a related art method, in which case, it is difficult to perform stable control since the reference current being input and the detected current are too low.

Accordingly, in an exemplary embodiment, an exclusive-use linear circuit configured to provide a fine current during a 2D mode has been added to the LED array that operates during a 3D, to enable a stable control. According to an exemplary embodiment, an exclusive-use linear circuit provides the fine current to the LED array only during the 2D mode. Furthermore, unlike a related art circuit where a plurality of LED arrays are operated by a plurality of driving circuits, in an exemplary embodiment, a plurality of LED arrays operate by one integrated driving circuit. The light emitting diode driving circuit that performs such an operation will be explained hereinafter with reference to FIGS. 7 and 8.

Figure 7:
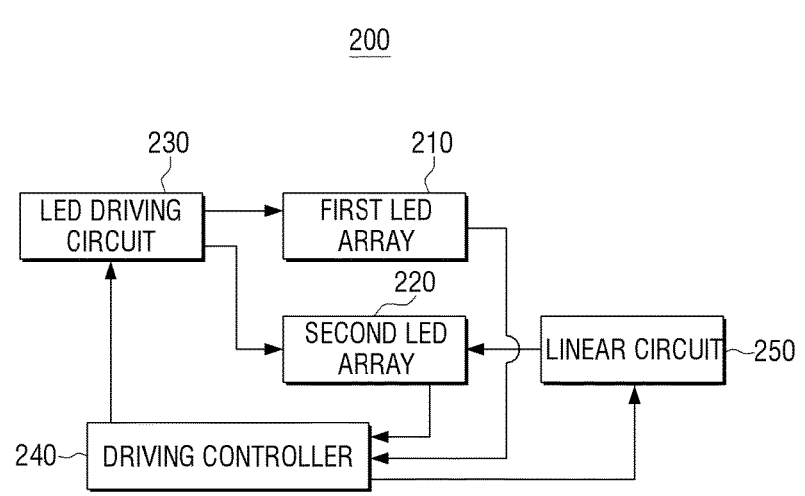
FIG. 7 is a block diagram illustrating a configuration of a light emitting diode driving circuit according to an exemplary embodiment.

FIG. 7 is a block diagram illustrating a light emitting diode driving circuit according to an exemplary embodiment.

Referring to FIG. 7, the light emitting diode driving circuit 200 may include a first LED array 210, a second LED array 220, an LED driving circuit 230, a driving controller 240, and a linear circuit 250. When mounted onto the display apparatus 100, the light emitting diode driving circuit 200 may operate as the backlight 200 such as the one illustrated in FIG. 1. Furthermore, of the aforementioned components, the light emitting diode driving circuit 200 may include the LED driving circuit 230, the driving controller 240, and the linear circuit 250 without having the LED arrays 210 and 220. That is, according to an exemplary embodiment, the LED arrays 210 and 220 may be omitted from the light emitting diode driving circuit 200.

The first LED array 210 emits light. More specifically, the first LED array 210 is a plurality of light emitting diodes (LED) connected in series that emit light of a brightness corresponding to the size of a current being provided from the LED driving circuit 230 during a 2D mode. Meanwhile, in an exemplary embodiment, it was illustrated that the first LED array 210 consists of one LED array, but the first LED array 210 may instead include a plurality of LED arrays connected in parallel.

Such a first LED array 210 may be arranged in a direct type first backlight panel, according to an exemplary embodiment.

The second LED array 220 emits light. More specifically, the second LED array 220 is a plurality of light emitting diodes (LED) connected in series that emit light of a brightness corresponding to the size of a current being provided from the LED driving circuit 230 during a 3D mode. Meanwhile, in an exemplary embodiment, it was explained that the second LED array 220 consists of one LED array, but it may include a plurality of LED arrays connected in parallel.

Such a second LED array 220 may be arranged in an edge type second backlight panel.

Furthermore, the second LED array 220 may emit light of a brightness corresponding to a fine current being provided from the linear circuit 250 during a 2D mode.

The LED driving circuit 230 provides a constant current to at least one of the first LED array 210 and the second LED array 220. More specifically, the LED driving circuit 230 may provide the constant current to the first LED array 210 during a 2D mode and provide the constant current to the second LED array 220 during a 3D mode selectively depending on the operating mode. The configuration and operations of the LED driving circuit 230 will be explained in greater detail hereinafter with reference to FIG. 8, according to an exemplary embodiment.

The driving controller 240 controls the LED driving circuit 230 and the linear circuit 250 such that a current corresponding to the operating mode and the dimming signal is provided to the LED array. More specifically, the driving controller 240 may control the LED driving circuit 230 and the linear circuit 250 such that a constant current is provided to the first LED array 210 or the second LED array 220 selectively depending on the operating mode and that a second current generated in the linear circuit 250 is provided to the second LED array 220 only when a constant current is being provided to the first LED array 210.

Herein, according to an exemplary embodiment, the driving controller 240 may control the LED driving circuit 230 such that different size constant currents are provided to the first LED array 210 and the second LED array 220 according to the operating modes.

Furthermore, the driving controller 240 may control the linear circuit 250 such that the second current which is a fine current is provided to the second LED array continuously regardless of a dimming cycle during a 2D mode.

The linear circuit 250 selectively provides a second current that is smaller than the constant current to the second LED array 220. More specifically, the linear circuit 250 may provide a fine current that is 2~3% size of the constant current to the second LED array 220 during a 2D mode. The configuration of such a linear circuit 250 will be explained in greater detail hereinafter with reference to FIG. 8, according to an exemplary embodiment.

Figure 8:
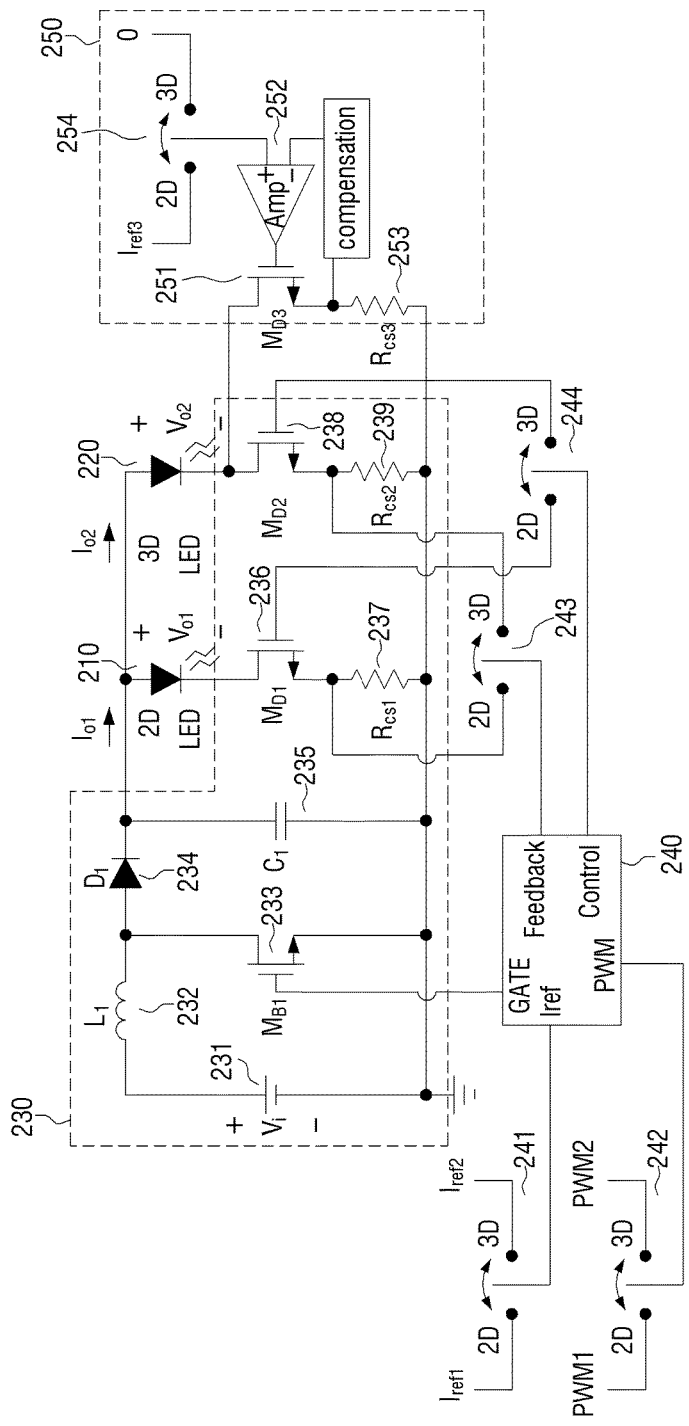
FIG. 8 is a circuit diagram illustrating an LED driving circuit and linear circuit according to an exemplary embodiment.

FIG. 8 is a circuit diagram of an LED driving circuit and a linear circuit such as the ones shown in FIG. 7, according to an exemplary embodiment.

Referring to FIG. 8, the LED driving circuit 230 includes a power source 231, an inductor 232, a first switch device 233, a first diode 234, a first capacitor 235, a second switch device 236, a first resistor 237, a third switch device 238, and a second resistor 239.

The power source 231 provides power to the LED driving circuit 230.

One end of the inductor 232 is connected to one end of the power source 231, and another end of the inductor 232 is commonly connected to one end of the switch device 233 and to an anode of the first diode 234.

The first switch device 233 performs a switching operation based on a control signal of the driving controller 240. The one end of the switch device 233 may be commonly connected to the another end of the inductor 232 and to the anode of the first diode 234, and another end of the switch device 233 may be connected to a ground end of the power source 231. Such a switch device 233 may be realized as a MOSFET for a high speed switching.

The anode of the first diode 234 is commonly connected to the another end of the inductor 232 and to the one end of the switch device 233, and a cathode of the first diode 234 is commonly connected to an end of the first capacitor 235, to an end of the first LED array 210 (more specifically, anode in the LED array 210), and to an end of the second LED array 220 (more specifically, anode in the LED array 220).

The one end of the first capacitor 235 is commonly connected to the cathode of the first diode 234 and to the one end of the LED array 210 (more specifically, the anode in the LED array 210), and to the one end of the second LED array 220 (more specifically, the anode in the LED array 220), and another end of the first capacitor 235 is connected to the ground end of the power source 231.

An end of the second switch device 236 is connected to a cathode of the first LED array 210, and another end of the second switch device 236 is connected to an end of the first resistor 237. Furthermore, the second switch device 236 performs a switching operation based on a control signal of the driving controller 240. Such a second switch device 236 may be realized as a MOSFET for a high speed switching.

The one end of the first resistor 237 is connected to the another end of the second switch device 236, and another end of the first resistor 237 is connected to the ground end of the power source 231. Herein, the first resistor 237 is a sensing resistor configured to sense a current flowing in the first LED array 210.

An end of the third switch device 238 is connected to a cathode of the second LED array 220, and another end of the third switch device 238 is connected to an end of the second resistor 239. Furthermore, the third switch device 238 performs a switching operation based on a control signal of the driving controller 240. Such a third switch device 238 may be realized as a MOSFET for a high speed switching.

The one end of the second resistor 239 is connected to the another end of the third switch device 238, and another end of the second resistor 239 is connected to the ground end of the power source 231. Herein, the second resistor 239 is a sensing resistor configured to sense a current flowing in the second LED array 220.

The linear circuit 250 allows a fine current to flow in the second LED 220 during a 2D mode. More specifically, the linear circuit 250 may include a fourth switch device 251, comparator 252, and third resistor 253.

An end of the fourth switch device 251 is commonly connected to the cathode of the second LED array 220 and to the one end of the third switch device 238, and another end of the fourth switch device 251 is connected to an end of the third resistor 253. Furthermore, the fourth switch device 251 performs a switching operation by an output signal of the comparator 252 to be explained in greater detail hereinafter.

The comparator 252 compares a voltage of the resistance with a predetermined voltage, and controls the fourth switch device 251. Such a comparator 252 may be realized as an OP-AMP, and may receive a resistance value of the third resistor 253 by its negative terminal, and receive a voltage corresponding to the size of a predetermined second current by its positive terminal, and output a difference between the resistance value and the voltage received. Meanwhile, according to exemplary embodiments, the voltage of the third resistor 253 may be compensated with a current, and then the compensated voltage may be directly compared with the size or amount of the predetermined second current.

The one end of the third resistor 253 is connected to the another end of the fourth switch device 251, and another end of the third resistor 253 is connected to the ground end of the power source 231. Herein, the resistance value of the third resistor 253 may be twenty or thirty times greater than the resistance value of the first resistor 237 or the second resistor 239, and accordingly, it is possible to stably sense a low current that is about 2~3% of the constant current flowing in the second LED array during a 3D mode.

According to such a configuration in an exemplary embodiment, the driving controller 240 converts the states of various switches 241, 242, 243, and 244 into a 3D mode such that the second switch device 236 does not operate during the 3D mode and that the third switch device 238 may provide a constant current according to a 3D dimming mode. Furthermore, in a 2D mode, the driving controller 240 converts the states of various switches 241, 242, 243, and 244 into a 3D mode such that the third switch device 238 does not operate, the second switch device 236 provides a constant current corresponding to the 2D dimming mode, and the linear circuit provides a fine current to the second LED array 220.

As aforementioned, a light emitting diode driving circuit according to an exemplary embodiment may light a dark portion during a 2D mode that may be generated by a dual backlight structure in a 3D backlight with a fine current, thereby preventing degradation of the screen. Furthermore, since the fine current is provided to the 3D backlight using a separate linear circuit and not a related art LED driving circuit, a stable control is possible.

Figure 9:
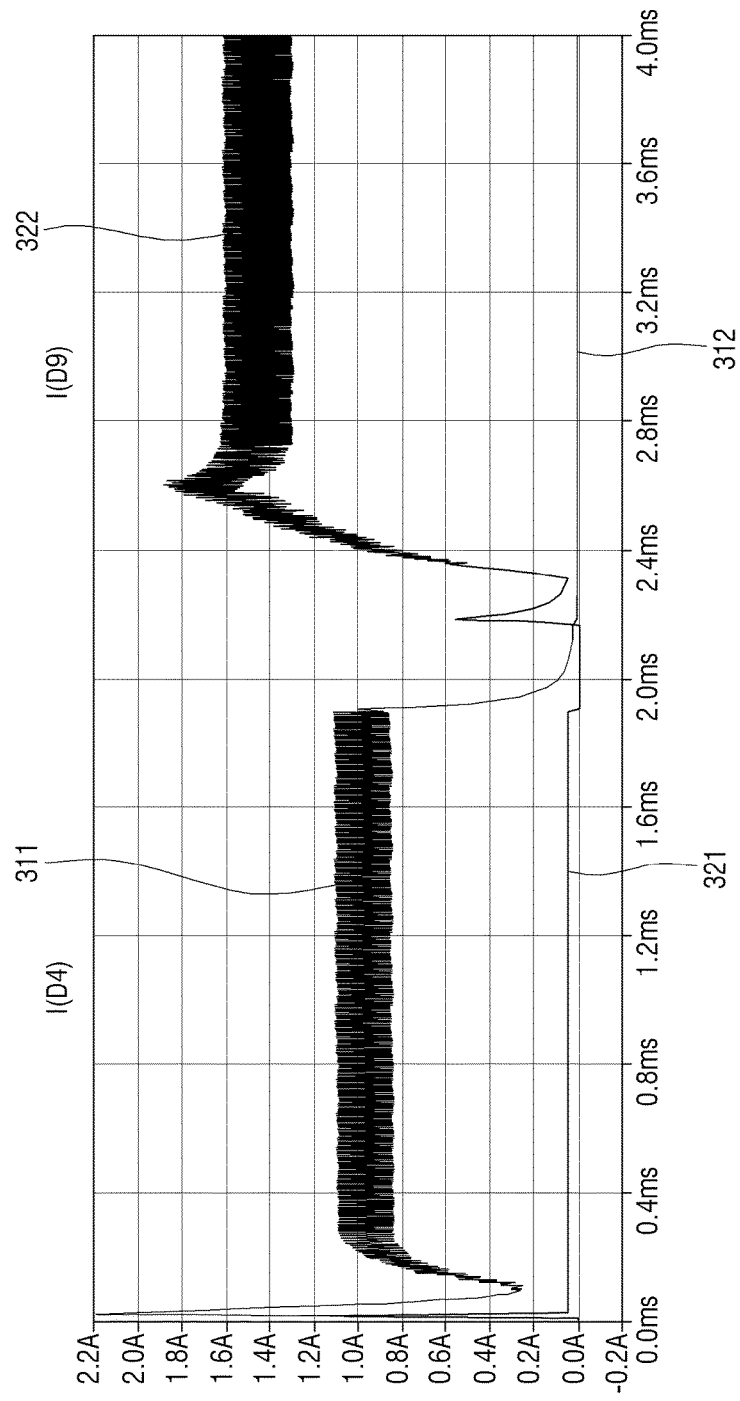
FIG. 9 is a waveform diagram illustrating results of a simulation according to an exemplary embodiment.

FIG. 9 is a waveform view illustrating a result of a simulation according to an exemplary embodiment.

Referring to FIG. 9, it can be seen that during a 2D mode, to the first LED array 210, a constant current 311 of about 1 A is provided, and that to the second LED array 220, a fine current 321 of about 50 mA is provided. Furthermore, it can be seen that during a 3D mode, a constant current 322 of about 1.5 A is provided only to the second LED array 220, and that the first LED array 210 does not operate and the current 312 is 0.

Meanwhile, as aforementioned, the second switch device and the third switch device do not operate simultaneously, and thus it is possible to use one resistor configuration for sensing a current flowing in the first LED array and for sensing a current flowing in the second LED array. Such an example will be explained hereinafter with reference to FIG. 10, according to yet another exemplary embodiment or an exemplary variation.

Figure 10:
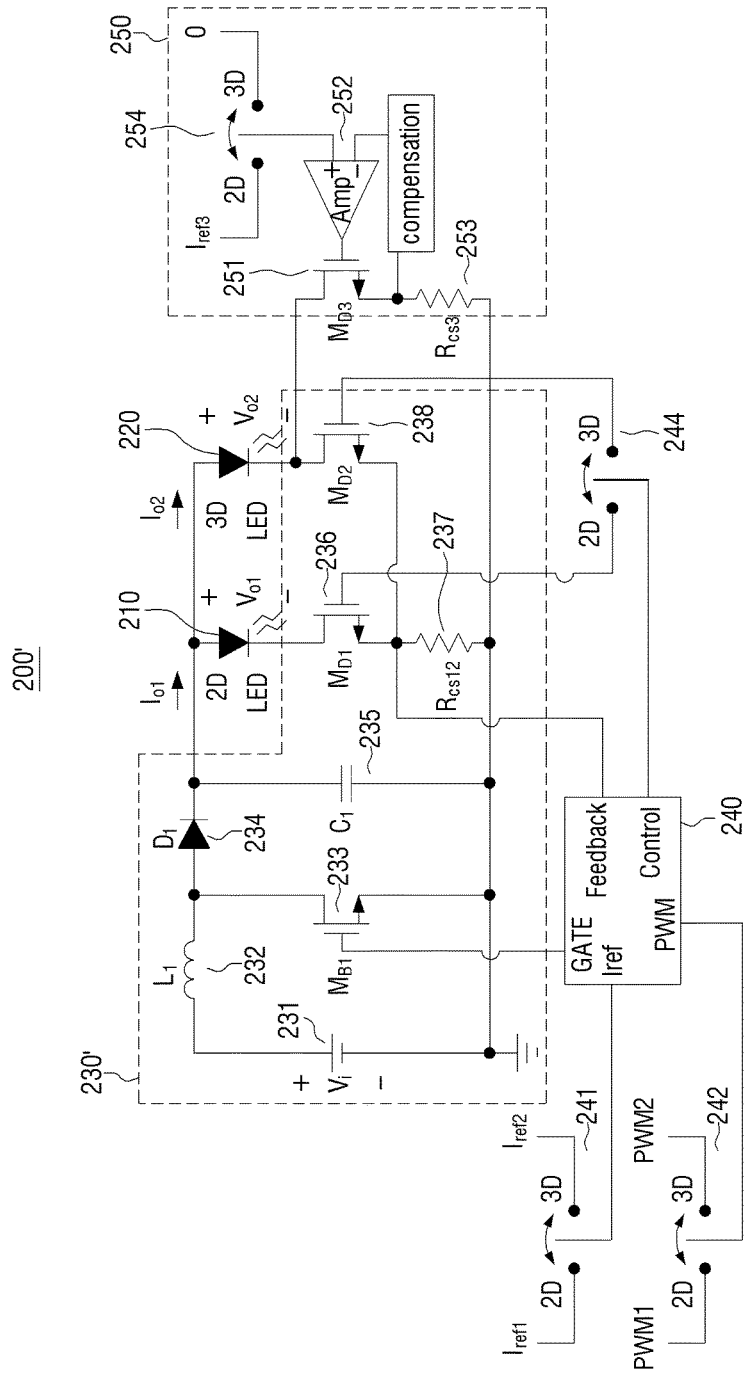
FIG. 10 is a circuit diagram illustrating a light emitting diode driving circuit according to yet another exemplary embodiment.

FIG. 10 is a circuit diagram illustrating a backlight according to another exemplary embodiment.

Referring to FIG. 10, the LED driving circuit 230' includes a power source 231, an inductor 232, a first switch device 233, a first diode 234, a first capacitor 235, a second switch device 236, a fourth resistor 237, and a third switch device 238.

The power source 231 provides power to the LED driving circuit 230.

An end of the inductor 232 is connected to an end of the power source 231, and another end of the inductor 232 is commonly connected to end of the first switch device 233 and to an anode of the first diode 234.

The first switch device 233 performs a switching operation based on a control signal of the driving controller 240. The one end of the first switch device 233 may be commonly connected to the another end of the first inductor 232 and to the anode of the first diode 234, and another end of the first switch device 233 may be connected to a ground end of the power source 231. Such a first switch device 233 may be realized as a MOSFET for a high speed switching.

The anode of the first diode 234 is commonly connected to the another end of the first inductor 232 and to the one end of the first switch device 233, and a cathode of the first diode 234 is commonly connected to an end of the first capacitor 235, to an end of the first LED array 210 (more specifically, an anode in the LED array 210), and to an end of the second LED array 220 (more specifically, an anode in the LED array 220).

The one end of the first capacitor 235 is commonly connected to the cathode of the first diode 234, to the one end of the LED array 210 (more specifically, the anode in the LED array 210), and to the one end of the second LED array 220 (more specifically, the anode in the LED array 220), and another end of the first capacitor 235 is connected to the ground end of the power source 231.

An end of the second switch device 236 is connected to a cathode of the first LED array 210, and another end of the second switch device 236 is commonly connected to an end of the fourth resistor 237 and to another end of the third switch device 238. Furthermore, the second switch device 236 performs a switching operation based on a control signal of the driving controller 240. Such a second switch device 236 may be realized as a MOSFET for a high speed switching.

The one end of the fourth resistor 237 is commonly connected to the another end of the second switch device 236 and to the another end of the third switch device 238, and another end of the fourth resistor 237 is connected to the ground end of the power source 231. Herein, the fourth resistor 237 is a sensing resistance for sensing a current that flows in the first LED array 210 or the second LED array 220. More specifically, the third switch device 238 is disconnected when operating in a 2D mode, and thus the fourth resistor 237 senses a current that flows in the first LED array 210 only. On the contrary, when operating in a 3D mode, the second switch device 236 is disconnected, and thus the fourth resistor 237 senses a current flowing in the second LED array 220 only.

An end of the third switch device 238 is connected to a cathode of the second LED array 220, and another end of the third switch device 238 is commonly connected to an end of the fourth resistor 237 and to the second switch device 236. Furthermore, the third switch device 238 performs a switching operation based on a control signal of the driving controller 240. Such a third switch device 238 may be realized as a MOSFET for a high speed switching.

The configuration of the linear circuit 250 is similar to the configuration of a linear circuit 250 of FIG. 8, and thus repeated explanation is omitted.

In an exemplary embodiment, a constant current is provided to the first LED array and the second LED array using one LED driving circuit, but according to exemplary embodiments, a constant current may be provided to the first LED array and the second LED array separately using a plurality of circuits. Such an exemplary embodiment will be explained hereinafter with reference to FIG. 11.

Figure 11:
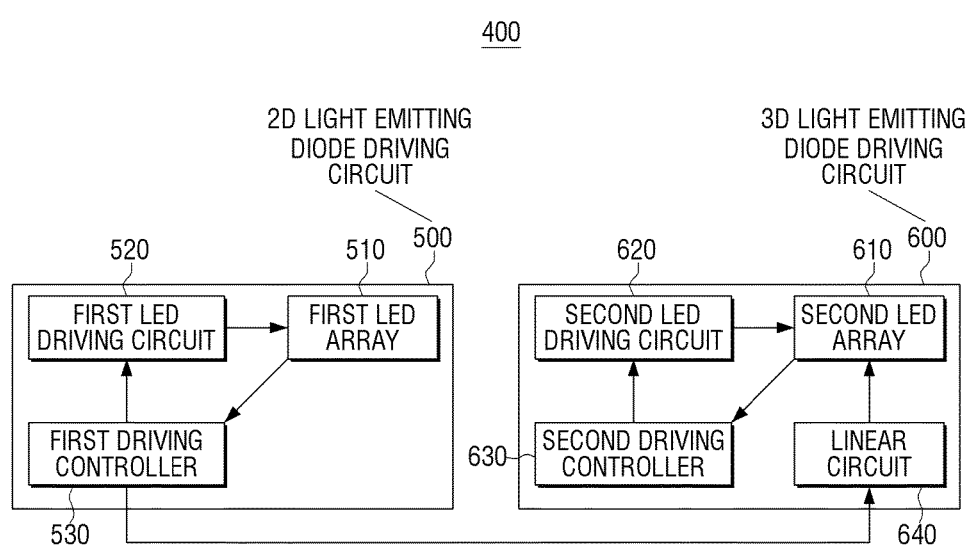
FIG. 11 is a block diagram illustrating a configuration of a light emitting diode driving circuit according to yet another exemplary embodiment.

FIG. 11 is a block diagram illustrating a configuration of a light emitting diode driving circuit according to yet another exemplary embodiment.

Referring to FIG. 11, the light emitting diode driving circuit 400 according to another exemplary embodiment includes a 2D light emitting diode driving circuit 500 and a 3D light emitting diode driving circuit 600.

The 2D light emitting diode driving circuit 500 includes a first LED array 510, a first LED driving circuit 520, and a first driving controller 530.

The first LED array 510 emits light. More specifically, the first LED array 510 is a plurality of light emitting diodes (LED) connected in a series that emit light of a brightness corresponding to the size or an amount of current being provided from the first LED driving circuit 520 during a 2D mode. Meanwhile, although in an exemplary embodiment, the first LED array 510 is illustrated to consist of one LED array, this is provided by way of an example only and not by way of a limitation, the first LED array 510 may be a plurality of LED arrays connected in parallel.

Such a first LED array 210 may be arranged in a direct type first backlight panel.

The first LED driving circuit 520 provides a constant current to the first LED array 510. More specifically, the first LED driving circuit 520 provides a constant current to the first LED array 510 during a 2D mode, but does not provide a constant current during a 3D mode. The configuration and operations of the first LED driving circuit 520 will be explained specifically hereinafter with reference to FIG. 12, according to an exemplary embodiment.

The first driving controller 530 controls the LED driving circuit 520 such that a current corresponding to a dimming signal is provided to the first LED array 510 during a 2D mode. Furthermore, the first driving controller 530 may control the LED driving circuit 520 such that a constant current is not provided to the first LED array 510 during a 3D mode.

In addition, the first driving controller 530 may control the linear circuit 640 such that a predetermined fine current is provided during a 3D mode. Herein, the first driving controller 530 may control the linear circuit 640 such that the second current which is a fine current is continuously provided to the second LED array 610 regardless of the dimming cycle during a 2D mode. Meanwhile, in an exemplary embodiment, it was explained and illustrated that the first driving controller 530 controls the linear circuit 640, but according to exemplary embodiments, the second controller 630 may be realized to control the linear circuit 640.

The 3D light emitting diode driving circuit 600 includes a second LED array 610, a second LED driving circuit 620, a second driving controller 630, and a linear circuit 640.

The second LED array 610 emits light. More specifically, the second LED array 610 is a plurality of light emitting diodes (LED) connected in series that emit light of a brightness corresponding to a current being provided from the second LED driving circuit 630 during a 3D mode. Meanwhile, although in an exemplary embodiment, the second LED array 610 is illustrated as consisting of one LED array, the second LED array 610 may include a plurality of LED arrays connected in parallel.

Such a second LED array 610 may be arranged in an edge type second backlight panel.

Furthermore, the second LED array 610 may emit light of a brightness corresponding to a fine current being provided from the linear circuit 640 during a 2D mode.

The second LED driving circuit 620 provides a constant current to the second LED array 610. More specifically, the second LED driving circuit 620 provides the constant current to the second LED array 610 during a 3D mode, but does not provide the constant current during a 2D mode. The configuration and operations of the second LED driving circuit 620, according to an exemplary embodiment, will be explained in greater detail hereinafter with reference to FIG. 13.

The second driving controller 630 controls the LED driving circuit 620 such that a current corresponding to a dimming signal is provided to the second LED array 610 during a 3D mode. Furthermore, the second driving controller 630 may control the second LED driving circuit 620 such that the constant current is not provided to the second LED array 610 during a 2D mode.

The linear circuit 640 selectively provides a second current that is smaller than the constant current to the second LED array 610. More specifically, the linear circuit 640 may provide a fine current that is 2~3% size of the constant current to the second LED array 610 during a 2D mode.

Figure 12:
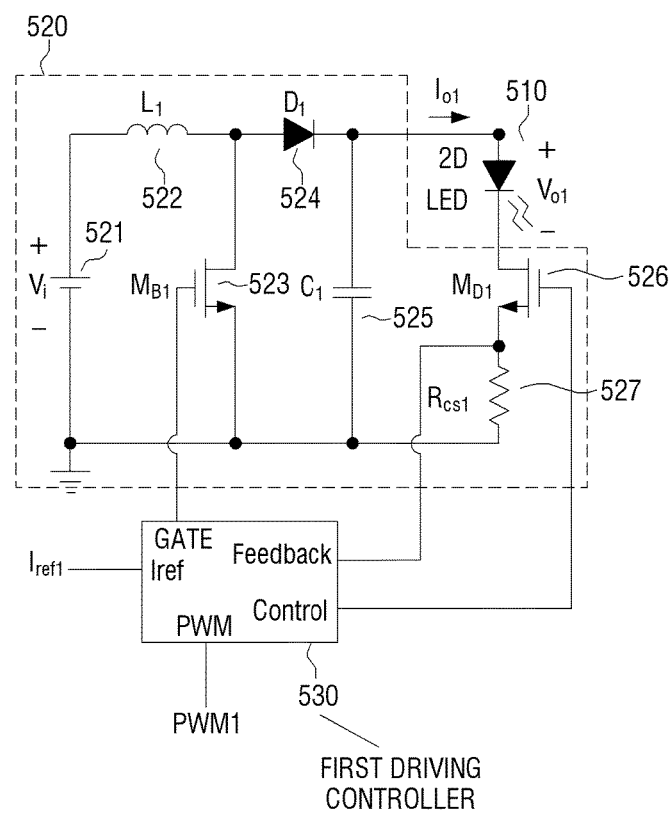
FIG. 12 is a circuit diagram of a first light emitting diode driving circuit according to an exemplary embodiment.

FIG. 12 is a diagram illustrating a first backlight such as the one depicted in FIG. 11, according to an exemplary embodiment.

Referring to FIG. 12, the first LED driving circuit 520 includes a power source 521, an inductor 522, a first switch device 523, a diode 524, a capacitor 525, a second switch device 526, and a first resistor 527.

The power source 521 provides power to a first LED driving circuit 510.

An end of the inductor 522 is connected to an end of the power source 521, and another end of the inductor 522 is commonly connected to an end of the first switch device 523 and to an anode of the diode 524.

The first switch device 523 performs a switching operation based on a control signal of the first driving controller 530. The one end of the first switch device 523 may be commonly connected to the another end of the inductor 522 and to the anode of the diode 524, and another end of the first switch device 523 may be connected to a ground end of the power source 521. Such a first switch device 523 may be realized as a MOSFET for a high speed switching.

The anode of the first diode 524 is commonly connected to the another end of the inductor 522 and to the one end of the first switch device 523, and a cathode of the first diode 524 is commonly connected to an end of the capacitor 525, and to an end of the first LED array 510 (more specifically, an anode in the first LED array 510).

The one end of the capacitor 525 is commonly connected to the cathode of the first diode 524 and to the one end of the first LED array 510 (more specifically, anode in the first LED array 510), and another end of the capacitor 525 is connected to the ground end of the power source 521.

An end of the second switch device 526 is connected to the cathode of the first LED array 510, and another end of the second switch device 526 is connected to an end of the first resistor 527. Furthermore, the second switch device 526 performs a switching operation based on a control signal of the first driving controller 530. Such a second switch device 526 may be realized as a MOSFET for a high speed switching.

The one end of the first resistor 527 is connected to the another end of the second switch device 526, and another end of the first resistor 527 is connected to the ground end of the power source 521. Herein, the first resistor 527 is a sensing resistor configured to sense a current that flows in the first LED array 510.

According to such a configuration of an exemplary embodiment, the first driving controller 530 may provide a control signal to the first switch device 523 and the second switch device 526 such that the second switch device 526 does not operate during a 3D mode and a constant current is provided during a 2D mode.

Figure 13:
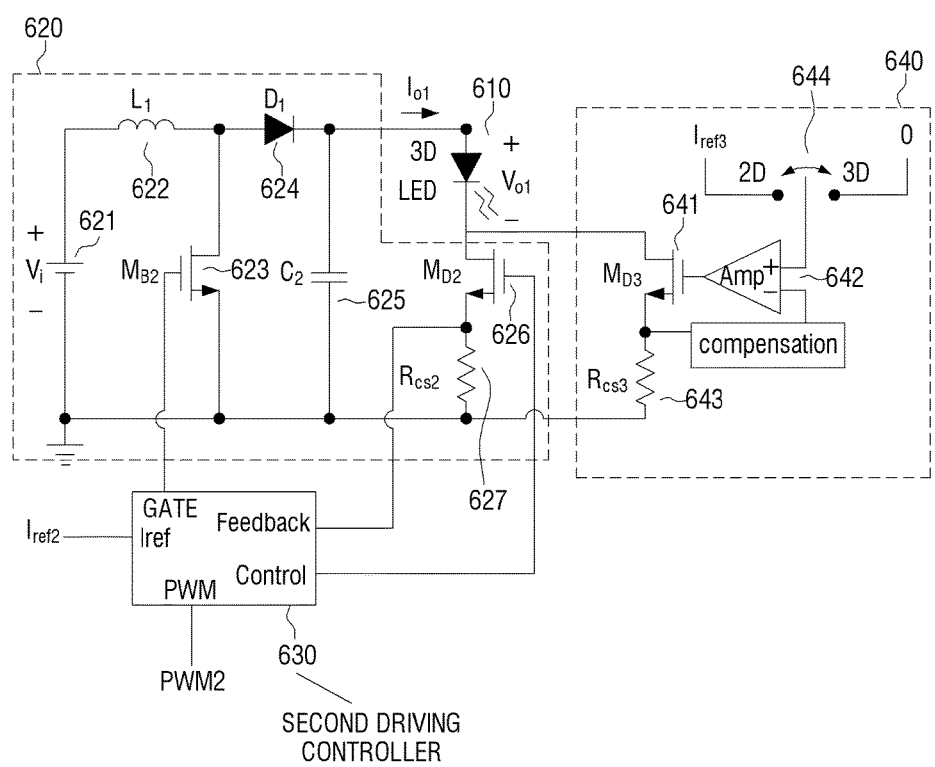
FIG. 13 is a circuit diagram of a second light emitting diode driving circuit according to an exemplary embodiment.

FIG. 13 is a diagram illustrating a second backlight such as the one depicted in FIG. 11, according to an exemplary embodiment.

Referring to FIG. 13, the second LED driving circuit 620 includes a power source 621, an inductor 622, a first switch device 623, a diode 624, a capacitor 625, a second switch device 626, and a first resistor 627.

The power source 621 provides power to the second LED driving circuit 620. Herein, the size or an amount of power of the power source 621 may be different from the size or amount of power provided by the power source 521 of the first LED driving circuit 520, depicted by way of an example in FIG. 12.

An end of the inductor 622 is connected to an end of the power source 621, and another end of the inductor 622 is commonly connected to an end of the first switch device 623 and to an anode of the diode 624.

The first switch device 623 performs a switching operation based on a control signal of the second driving controller 630. The one end of the first switch device 622 may be commonly connected to the another end of the inductor 622 and to the anode of the diode 624, and another end of the first switch device 622 may be connected to a ground end of the power source 621. Such a first switch device 623 may be realized as a MOSFET for a high speed switching.

The anode of the first diode 624 is commonly connected to the another end of the inductor 622 and to the one end of the first switch device 623, and a cathode of the first diode 624 is commonly connected to an end of the capacitor 625 and to an end of the second LED array 610 (more specifically, an anode in the second LED array 610).

The one end of the capacitor 625 is commonly connected to a cathode of the diode 624 and to an end of the second LED array 610 (more specifically, an anode in the second LED array 610), and another end of the capacitor 625 is connected to the ground end of the power source 621.

An end of the second switch device 626 is connected to a cathode of the second LED array 610, and another end of the second switch device 626 is connected to an end of the first resistor 627. Furthermore, the second switch device 626 performs a switching operation based on a control signal from the second driving controller 630. Such a second switch device 626 may be realized as a MOSFET for a high speed switching.

The one end of the first resistor 627 is connected to the another end of the second switch device 626, and another end of the first resistor 627 is connected to the ground end of the power source 621. Herein, the first resistor 627 is a sensing resistor configured to sense a current that flows in the second LED array 610.

The linear circuit 640 allows a fine current to flow in the second LED array 610 during a 2D mode. More specifically, the linear circuit 640 may include a fourth switch device 641, a comparator 642, and a third resistor 643.

An end of the fourth switch device 641 is commonly connected to a cathode of the second LED array 610 and to an end of the second switch device 626, and another end of the fourth switch device 641 is connected to an end of the third resistor 643. Furthermore, the fourth switch device 641 performs a switching operation by an output signal of the comparator 642 to be explained hereinafter.

The comparator 642 compares a voltage of the resistance with a predetermined voltage and controls the fourth switch device 641. Such a comparator 642 may be realized as an OP-AMP, and may receive a resistance value of the third resistor 643 into its negative terminal, and receive a voltage corresponding to the size or an amount of the predetermined second current by a positive terminal, and output a different between the resistance value and the voltage received. Meanwhile, according to exemplary embodiments, the voltage of the third resistor 643 may be compensated with a current value, and the compensated voltage may be directly compared with the size or an amount of the predetermined second current.

The one end of the third resistor 643 is connected to the another end of the fourth switch device 641, and another end of the third resistor 643 is connected to the ground end of the power source 621. Herein, the resistance value of the third resistor 643 may be twenty or thirty times greater than the resistance value of the first resistor 627, and accordingly, during a 3D mode, a low current of about 2~3% of the constant current flowing in the second LED array 610 may be stably sensed.

As aforementioned, the second light emitting diode according to an exemplary embodiment may light a dark portion in a 2D mode that may be generated by a dual backlight structure on a 3D backlight with a fine current, and prevent degradation of the screen. Furthermore, since the fine current is provided to the 3D backlight using a separate linear circuit and not a related art LED driving circuit, a stable control is possible.

Figure 14:
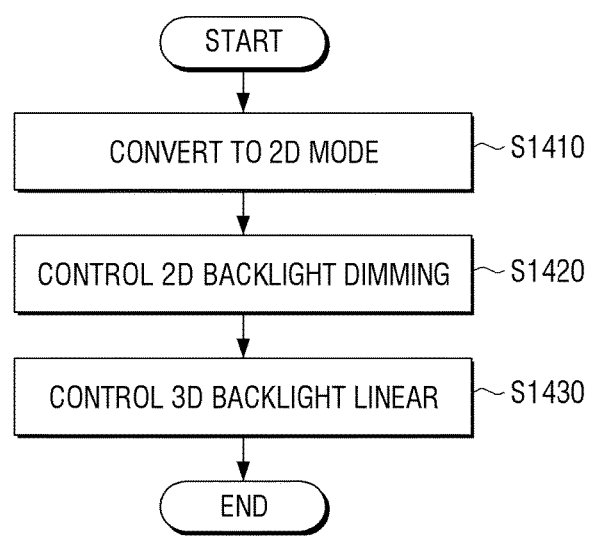
FIG. 14 is a flowchart illustrating a method of driving a light emitting diode according to an exemplary embodiment.

FIG. 14 is a flowchart illustrating a method of driving a light emitting diode according to an exemplary embodiment.

Referring to FIG. 14, a constant current generated in the LED driving circuit is selectively provided to the LED array corresponding to the operating mode (in operations S1410, S1420). More specifically, in the case of a 2D mode, the constant current generated in the LED driving circuit may be provided to the first LED array corresponding to 2D, and in the case of a 3D mode, the constant current generated in the LED driving circuit may be provided to the second LED array corresponding to 3D. Herein, different size or amount of constant currents may be provided to the first LED array and the second LED array according to the operating mode. For example, a constant current of 1.5 A may be provided during a 3D mode, and a constant current of 1 A may be provided during a 2D mode.

Meanwhile, when converted into a 2D mode, using the linear circuit, a second current that is smaller than the constant current is provided to the LED array to which the constant current is not provided (in operation S1430). More specifically, the second current may be continuously provided to the second LED array regardless of the first dimming cycle for providing the constant current to the LED array that operates during a 2D mode.

Therefore, a method for driving a light emitting diode according to an exemplary embodiment may light a dark portion in a 2D mode that may be generated by a structure of a dual backlight on a 3D backlight with a fine current, thereby preventing degradation of the screen. Furthermore, since the fine current is provided to the 3D backlight using a separate linear circuit and not a related art driving circuit, a stable control is possible. A method for driving a light emitting diode as in FIG. 14 may be implemented in a display apparatus having the configuration of FIG. 1 or in an LED driving circuit having a configuration of FIG. 7 or FIG. 11, or in a display apparatus, LED driving circuit, or control IC having other configurations.

Furthermore, the aforementioned method for driving the light emitting diode may be realized as a program that includes an algorithm implementable in a computer, and the aforementioned program may be stored in a non-transitory computer readable medium and be provided there through.

A non-transitory computer readable medium refers to a computer readable medium configured to store data semi-permanently, not a medium that stores data for a short period of time such as a register, cache, or memory and the like. More specifically, the aforementioned various applications or programs may be stored in a non-transitory computer readable medium such as CD, DVD, hard disc, blueray disc, USB, memory card, ROM and the like, and be provided there through.

The foregoing exemplary embodiments are merely exemplary and are not to be construed as limiting. Exemplary embodiments can be readily applied to other types of apparatuses. Also, the description of exemplary embodiments is intended to be illustrative, and not to limit the scope of the claims and their equivalents, and many alternatives, modifications, and variations will be apparent to those skilled in the art.

What is claimed is:

1. A light emitting diode driving circuit comprising:
a first light emitting diode (LED) array;
a second LED array;
an LED driving circuit configured to provide a constant current to at least one of the first LED array and the second LED array based on an operating mode;
a linear circuit; and
a driving controller configured to:
based on the operating mode being a two dimensional (2D) mode, control the LED driving circuit to provide a first constant current to the first LED array according to a first dimming signal corresponding to the 2D mode, and
based on the operating mode being a three dimensional (3D) mode, control the LED driving circuit to provide a second constant current to the second LED array according to a second dimming signal corresponding to the 3D mode, wherein the second dimming signal is different from the first dimming signal,
wherein the driving controller is configured to control the linear circuit to provide a current that is smaller than the first constant current to the second LED array in the 2D mode,
wherein the current is not provided by the linear circuit to the second LED array in the 3D mode,
wherein, in the 3D mode, the second LED array is operated by the LED driving circuit without the first LED array being operated, and
wherein, in the 2D mode, the first LED array is operated by the LED driving circuit using the first constant current and the second LED array is operated by the linear circuit using the second constant current.

2. The light emitting diode driving circuit according to claim 1,
wherein the first LED array is arranged in a direct type, and
wherein the second LED array is arranged in an edge type.

3. The light emitting diode driving circuit according to claim 1, wherein the first constant current is different from the second constant current.

4. The light emitting diode driving circuit according to claim 1, wherein the driving controller controls the linear circuit to continuously provide the current to the second LED array regardless of the first dimming signal corresponding to the 2D mode.

5. The light emitting diode driving circuit according to claim 1, wherein the linear circuit comprises:
a switch device connected to a first end of the second LED array;
a resistor connected to a second end of the switch device; and
a comparator configured to compare a voltage of the resistor with a threshold voltage and further configured to control the switch device based on the comparison.

6. The light emitting diode driving circuit according to claim 5, further comprising a compensator configured to compensate the voltage of the resistor and to provide the compensated voltage of the resistor to the comparator.

7. The light emitting diode driving circuit according to claim 5,
wherein the LED driving circuit comprises a first resistor for sensing a current flowing through the first LED array and a second resistor for sensing a current flowing through the second LED array, and
wherein a resistance value of the resistor of the linear circuit is approximately twenty to thirty times greater than a resistance value of the first resistor or the second resistor of the LED driving circuit.

8. The light emitting diode driving circuit according to claim 1,
wherein the LED driving circuit comprises:
a power source configured to provide power to the LED driving circuit;
an inductor, which has a first end connected to the power source;
a first switch device configured to selectively connect the inductor to a ground end of the power source based on a control signal from the driving controller;
a diode, which has an anode commonly connected to a first end of the first switch device and a second end of the inductor and which has a cathode commonly connected to a first end of the first LED array and to a first end of the second LED array;
a capacitor, which has a first end commonly connected to a cathode of the diode, to the first end of the first LED array and to the first end of the second LED array, and has a second end connected to the ground end of the power source;
a second switch device connected to a second end of the first LED array;
a first resistor, which has a first end connected to a second end of the second switch device, and has a second end connected to the ground end of the power source;
a third switch device connected to a second end of the second LED array; and
a second resistor, which has a first end commonly connected to the second end of the third switch device, and has a second end connected to the ground end of the power source.

9. The light emitting diode driving circuit according to claim 8,
wherein the driving controller alternately operates the second switch device and the third switch device according to the operating mode.

10. The light emitting diode driving circuit according to claim 1,
wherein the LED driving circuit comprises:
a power source configured to provide power to the LED driving circuit;
an inductor, which has a first end connected to the power source;
a first switch device configured to selectively connect the inductor to a ground end of the power source based on a control signal of the driving controller;
a diode, which has an anode commonly connected to a first end of the switch device and to a second end of the inductor, and which has a cathode commonly connected to a first end of the first LED array and to a first end of the second LED array;
a capacitor, which has a first end commonly connected to the cathode of the diode, to the first end of the first LED array, and to the first end of the second LED array, and which has a second end connected to the ground end of the power source;
a second switch device connected to a second end of the first LED array;
a third switch device connected to a second end of the second LED array; and
a fourth resistor, which has a first end commonly connected to a second end of the second switch device and to a second end of the third switch device, and which has a second end connected to the ground end of the power source.

11. The light emitting diode driving circuit according to claim 1, wherein the second LED array is positioned between the first LED array and a liquid crystal display.

* * * * *